July 26, 1960

O. R. EICKMEYER ET AL 2,946,135

EDUCATIONAL DEVICE

Filed Jan. 29, 1960

INVENTORS
OTTO R. EICKMEYER,
CATHERINE J. PITT,
BY

McMorrow, Berman & Davidson
ATTORNEYS

July 26, 1960     O. R. EICKMEYER ET AL     2,946,135
EDUCATIONAL DEVICE
Filed Jan. 29, 1960     2 Sheets-Sheet 2
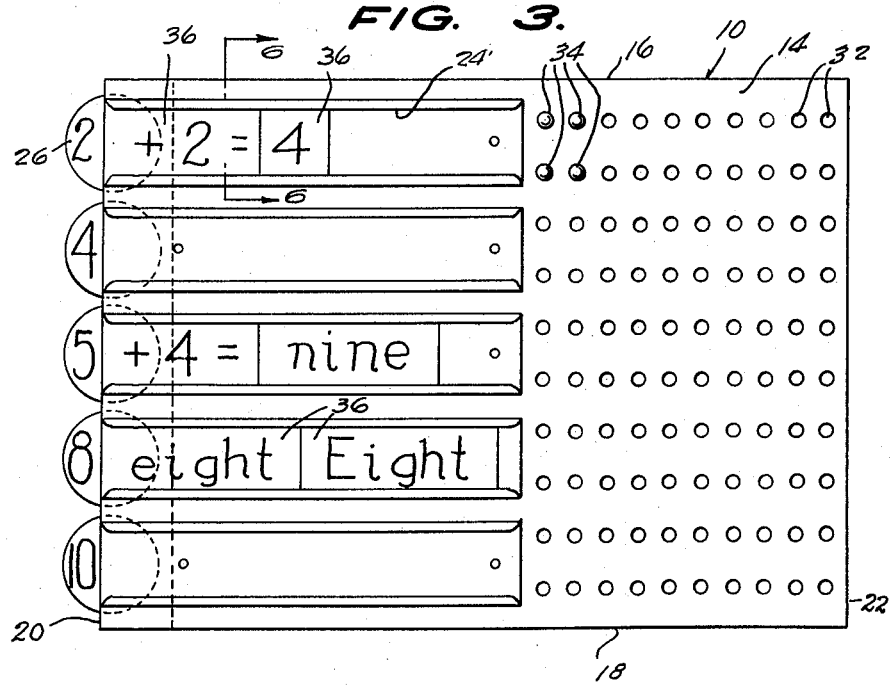
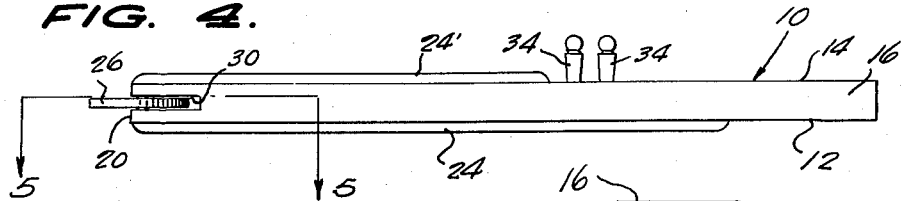
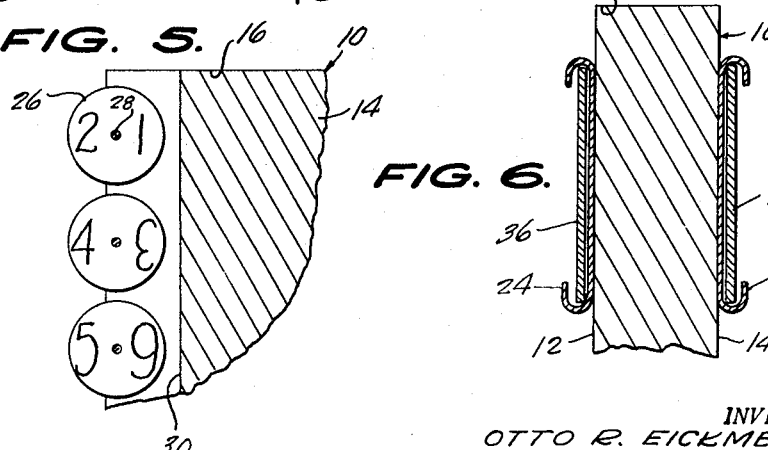
INVENTORS
OTTO R. EICKMEYER,
CATHERINE J. PITT,
BY
McMorrow, Berman & Davidson
ATTORNEYS.

United States Patent Office 2,946,135
Patented July 26, 1960

2,946,135

EDUCATIONAL DEVICE

Otto R. Eickmeyer and Catherine J. Pitt, Jr., both of 1212 18th Ave., Menominee, Mich.

Filed Jan. 29, 1960, Ser. No. 5,522

6 Claims. (Cl. 35—31)

The present invention relates to an educational device for aiding in the teaching of children.

In the art of teaching primary students words, language, sentence construction, and primary arithmetic, visual aids or devices are of value and importance. Not all of the devices proposed or put into use have been widely accepted by the teaching profession. Most of the devices proposed have been complicated in structure, difficult to assemble, and relatively expensive to manufacture.

An object of the present invention is to provide an educational device in the form of a visual teaching aid which enables a primary student to match numbers with number words, match pictures with picture name words, perform simple addition, subtraction, and multiplication, associate like or rhyming words together, associate colors with color name words, and other primary educational operations.

Another object of the present invention is to provide an educational device for assisting in the education of a primary student which is compact in size and neat in appearance, one which is sturdy in construction and simple in structure, one which may be manufactured in quantity at reasonable cost, and one which is highly effective in action.

A further object of the present invention is to provide an educational device which will invite interest in a child, one which will attract a child by the use of colors and the opportunity to devise and create, and one which lends itself to use in either school or home with the assistance of teachers or parents.

These and other objects and advantages of the present invention will be fully apparent from the following description when taken in conjunction with the annexed drawings, in which:

Figure 3 is a plan view of the other face of the device;

Figure 4 is a view of the device shown in Figure 3, as seen from the top;

Figure 5 is a fragmentary view on an enlarged scale, taken on the line 5—5 of Figure 4;

Figure 6 is a fragmentary view on an enlarged scale, taken on the line 6—6 of Figure 3.

Figure 1:
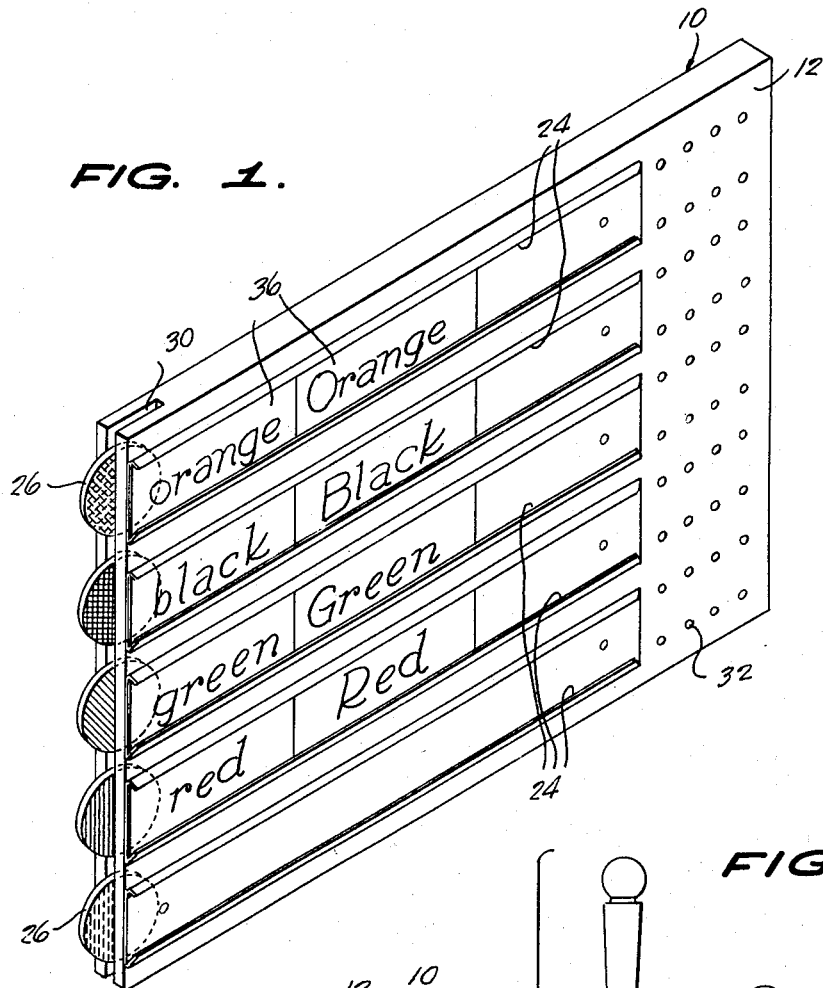
Figure 1 is an isometric view of the educational device of the present invention, showing one face.
Figure 2:
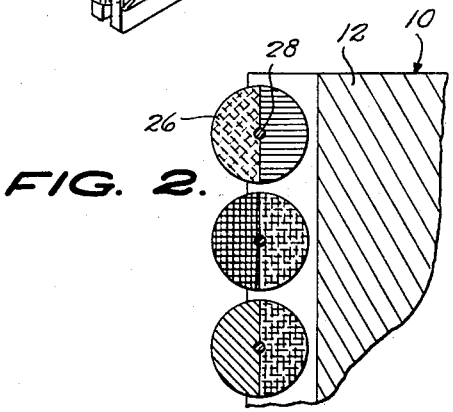
Figure 2 is a fragmentary view in section of a portion of the device.

Referring in greater detail to the drawings in which like numerals indicate like parts throughout the several views, in Figures 1, 3, and 4, the reference numeral 10 designates a board having a front face 12 and a back face 14. It is to be understood that naming of the faces of the board 10 as front face 12 and back face 14 is for the purpose of description only.

The board 10 includes a top 16, a bottom 18, and sides 20 and 22 extending between adjacent ends of the top 16 and bottom 18.

A plurality of channel strips or slideways 24 are arranged in superimposed vertical spaced relation and positioned on the front face 12 so that they extend inwardly from the side 20.

A disc 26 is positioned contiguously to the side 20, adjacent each slideway 24, so that a half portion projects outwardly from the side 20 with the other half concealed by the front face 12 and underlying the adjacent slideway 24 on the front face 12.

A fixed pin 28 connects each disc 26 to the board 10 for rotary movement about the pin 28 as an axis transversely arranged with respect to the board 10.

As shown in Figure 4, a side 20 of the board 10 is provided with a groove 30 extending inwardly from the side and terminating at a point spaced from the side. The discs 26 are arranged within the groove 30 so that they rotate freely when moved by the finger of a hand of the user.

The front face 12 is provided with a plurality of peg-receiving holes 32 in the part of the front face 12 between the slideways 24 and the side 22 of the board 10. The holes 32 are arranged in parallel rows with two rows extending from each of the slideways 24.

Figure 7:
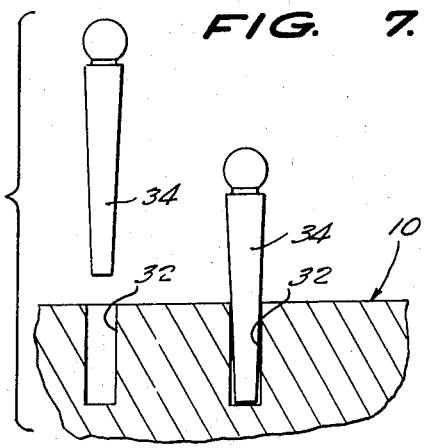
Figure 7 is an exploded view partially in section showing one peg received in one of the peg-receiving holes and another peg in a position removed from another of such holes.

The present invention provides a plurality of pegs 34. The pegs 34 are insertable into and withdrawable from the rows of holes 32 opposite any one of the slideways 24, as shown in Figure 7.

The back face 14 of the board 10 is similarly provided with other slideways 24' and with rows of holes 32 extending between the slideways 24' and the side 22 of the board 10. The holes are in two rows for each slideway 24' and are in alignment therewith.

As illustrated in the accompanying drawings, two uses of the device of the present invention are shown, although numerous other uses will be obvious to a teacher or parent of a child of kindergarten, first or second grade primary school age.

In use, a plurality of cards 36, each bearing indicia symbolic of an educational operation such as addition, subtraction, or multiplication, are insertable into and withdrawable from the slideways 24', as shown in Figure 3.

The face of each of the discs 26 adjacent the board face 14 has indicia designation extending over one-half of the disc face with indicia designation of a different numeral extending over the other half of the face. This is shown most clearly in Figure 5, in which the last-named indicia are inverted with respect to the first-named indicia. In the uppermost one of the slideways 24' in Figure 3, a first card bears the indicia "plus 2 equals," and a second card bears the indicia "4." One of the indicia designations on half of the uppermost disc 26 is "2." The child receiving instruction may rotate the disc 26 manually to bring into registry with the cards in the slideway 24' the indicia on the disc 26 which corresponds to the arithmetical problem presented by such cards. In other of the slideways 24' on the back face 14, cards which bear the name of the number on the half of the adjacent disc 26 may be inserted by the child. Obviously, other arithmetical problems may be presented to a child, using the discs 26 and slideways 24'. Additionally, a number of pegs 34 may be inserted by the child in the holes 32 to correspond with the solution to the educational operation, as shown in Figure 3, in which the top two rows of holes 32 have, at their left hand ends, two pegs each, or a total of four pegs, agreeing with the number solution of the problem presented on the cards 36 in the uppermost slideway 24'.

In Figure 1, the slideways 24, with the exception of the lowermost slideway 24, have cards 36 therein with the names of colors inscribed thereon. The faces of the discs 26 are provided with colored areas each extending over half of each disc 26, one of the areas being of a color named on the adjacent card 36. The other half areas of each disc 26 has a different color. The child being taught may rotate the disc 26 adjacent each slideway 24 to bring into registry with the end of the slideway 24 the half of the disc 26 having the color corresponding to the name of the color on the adjacent card 36.

Additionally, some of the pegs 34 may be divided into groups with certain of the groups of one color and other of the groups of pegs of different colors so that the groups of pegs may be insertable into and withdrawable from the rows of holes 32 opposite any slideway 24 carrying a corresponding color card.

The device of the present invention lends itself to many other teaching operations than the ones shown as will occur to a teacher or parent and numerous modifications and changes may be made in the device as desired without departing from the spirit of the invention as set forth in the appended claims.

What is claimed is:

1. An educational device comprising a board having a front face and a back face and including a top, a bottom, and a side extending between adjacent ends of said top and bottom, a plurality of slideways arranged in superimposed vertical spaced relation positioned on one of said faces so that they extend inwardly from one side thereof, a disc positioned contiguous to said one board side so that a half portion projects outwardly from said one board side with the other half portion concealed by said one face and underlying an adjacent slideway and connected at its midpoint to said board for rotary movement about an axis transversely of said board, the face of each of said discs adjacent said board one face having an indicia designation extending over one half of said disc face and having a different indicia designation extending over the other half of said disc face, and a plurality of cards each bearing indicia symbolic of an educational operation, said cards being insertable into and withdrawable from said slideways.

2. An educational device comprising a board having a front face and a back face and including a top, a bottom, and a side extending between adjacent ends of said top and bottom, a plurality of slideways arranged in superimposed vertical spaced relation positioned on one of said faces so that they extend inwardly from one side thereof, a disc positioned contiguous to said one board side so that a half portion projects outwardly from said one board side with the other half portion concealed by said one face and underlying an adjacent slideway and connected at its midpoint to said board for rotary movement about an axis transversely of said board, the face of each of said discs adjacent said board one face having an indicia designation extending over one half of said disc face and having a different indicia designation extending over the other half of said disc face, a plurality of cards each bearing indicia symbolic of an educational operation, said cards being insertable into and withdrawable from said slideways, there being a plurality of peg-receiving holes in the part of said one face between said slideways and the other side of said board, said holes being arranged in parallel rows, and a plurality of pegs, said pegs being insertable into and withdrawable from rows of holes opposite a slideway carrying cards designating the digit corresponding to the number solution of an educational operation.

3. An educational device comprising a board having a front face and a back face and including a top, a bottom, and a side extending between adjacent ends of said top and bottom, a plurality of slideways arranged in superimposed vertical spaced relation positioned on one of said faces so that they extend inwardly from one side thereof, a disc positioned contiguous to one board side so that a half portion projects outwardly from said one board side with the other half portion concealed by said one face and underlying an adjacent slideway and connected at its midpoint to said board for rotary movement about an axis transverse of said board, the face of each disc adjacent said board one face having a color extending over one half of said face and having a different color extending over the other half of said face, and a plurality of cards each bearing a word color designation, said cards being insertable into and withdrawable from said slideways.

4. An educational device comprising a board having a front face and a back face and including a top, a bottom, and a side extending between adjacent ends of said top and bottom, a plurality of slideways arranged in superimposed vertical spaced relation positioned on one of said faces so that they extend inwardly from one side thereof, a disc positioned contiguous to one board side so that a half portion projects outwardly from said one board side with the other half portion concealed by said one face and underlying an adjacent slideway and connected at its midpoint to said board for rotary movement about an axis transverse of said board, the face of each disc adjacent said board one face having a color extending over one half of said face and having a different color extending over the other half of said face, a plurality of cards each bearing a word color designation, said cards being insertable into and withdrawable from said slideways, there being a plurality of peg-receiving holes in the part of said one face between said slideways and the other side of said board, said holes being arranged in parallel rows, and a plurality of pegs, said pegs being divided into several groups, the groups of pegs being of different colors, each group of pegs being insertable into and withdrawable from rows of holes opposite a slideway carrying a corresponding color card.

5. An educational device comprising a board having a front face and a back face and including a top, a bottom, and a side extending between adjacent ends of said top and bottom, a first plurality of slideways arranged in superimposed vertical spaced relation positioned on said front face so that they extend inwardly from one side thereof, a second plurality of slideways arranged in superimposed vertical spaced relation positioned on said back face so that they extend inwardly from said one side, the slideways on said front face being in registry with the slideways on said back face, a disc positioned contiguous to said one board side so that a half portion projects outwardly from said one board side with the other half portion concealed by said front and back faces and underlying adjacent slideways, each of said discs being connected to said board for rotary movement about an axis transversely of said board, the face of each of said discs adjacent said board front face having an indicia designation extending over one half of said disc face and having a different indicia designation extending over the other half of said disc face, the face of each of said discs adjacent said board back face having a color extending over one half of said face and having a different color extending over the other half of said face, a first plurality of cards each bearing indicia symbolic of an educational operation insertable into and withdrawable from the slideways on said board front face, and a second plurality of cards each bearing a word color designation insertable into and withdrawable from the slideways on said board back face.

6. An educational device comprising a board having a front face and a back face and including a top, a bottom, and a side extending between adjacent ends of said top and bottom, a first plurality of slideways arranged in superimposed vertical spaced relation positioned on said front face so that they extend inwardly from one side thereof, a second plurality of slideways arranged in superimposed vertical spaced relation positioned on said back face so that they extend inwardly from said one side, the slideways on said front face being in registry with the slideways on said back face, a disc positioned contiguous to said one board side so that a half portion projects outwardly from said one board side with the other half portion concealed by said front and back faces and underlying adjacent slideways, each of said discs being connected to said board for rotary movement about an axis transversely of said board, the face of each of said discs adjacent said board front face having an indicia designation extending over one half of said disc face and having a different indicia designation extending over the other half of said disc face, the face of each of said discs adjacent said board back face having a color extending over one half of said face and having a different color extending over the other half of said face, a first plurality of cards each bearing indicia symbolic of an educational operation insertable into and withdrawable from the slideways on said board front face, a second plurality of cards each bearing a word color designation insertable into and withdrawable from the slideways on said board back face, there being a first plurality of peg-receiving holes in the part of said board front face between the front face slideways and the other side of said board and a second plurality of peg-receiving holes in the part of said board back face between the back face slideways and the other side of said board, the holes in the front and back faces being in parallel rows, a first plurality of pegs insertable into and withdrawable from the rows of holes opposite a front face slideway carrying cards designating the digit corresponding to the number solution of an educational problem, and a second plurality of pegs, said pegs being divided into several groups, the groups of pegs being of different colors, each group of pegs being insertable into and withdrawable from the rows of holes opposite a slideway carrying a corresponding color card.

References Cited in the file of this patent

UNITED STATES PATENTS

| | | |
|---|---|---|
| 371,338 | Matson | Oct. 11, 1887 |
| 445,782 | Jahr et al. | Feb. 3, 1891 |
| 480,164 | Barrett | Aug. 2, 1892 |
| 618,198 | Brodt et al. | Jan. 24, 1899 |

FOREIGN PATENTS

| | | |
|---|---|---|
| 749,001 | Great Britain | May 16, 1956 |